(12) United States Patent
Ramaswamy et al.

(10) Patent No.: US 6,643,629 B2
(45) Date of Patent: Nov. 4, 2003

(54) METHOD FOR IDENTIFYING OUTLIERS IN LARGE DATA SETS

(75) Inventors: Sridhar Ramaswamy, Scotch Plains, NJ (US); Rajeev Rastogi, New Providence, NJ (US); Kyuseok Shim, Bedminster, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/442,912

(22) Filed: Nov. 18, 1999

(65) Prior Publication Data

US 2003/0061249 A1 Mar. 27, 2003

(51) Int. Cl.[7] .............................. G06F 17/00; G06N 5/00
(52) U.S. Cl. .............................. 706/45; 706/12; 706/925
(58) Field of Search ............................. 706/45, 12, 925; 707/100

(56) References Cited

U.S. PATENT DOCUMENTS 6,003,029 A * 12/1999 Agrawal et al. ................ 707/1
6,049,797 A * 4/2000 Guha et al. .................... 705/27
6,092,072 A * 7/2000 Guha et al. .................... 707/100

OTHER PUBLICATIONS

Sumit Sen et al; Clustering of Relational Data Containing Noise and Outliers; 1998; IEEE; 0–7803–4863–X/98; 1998; 1411–1416.*

* cited by examiner

Primary Examiner—Emanuel Todd Voeltz
Assistant Examiner—Joseph P. Hirl

(57) ABSTRACT

A new method for identifying a predetermined number of data points of interest in a large data set. The data points of interest are ranked in relation to the distance to their neighboring points. The method employs partition-based detection algorithms to partition the data points and then compute upper and lower bounds for each partition. These bounds are then used to eliminate those partitions that do contain the predetermined number of data points of interest. The data points of interest are then computed from the remaining partitions that were not eliminated. The present method eliminates a significant number of data points from consideration as the points of interest, thereby resulting in substantial savings in computational expense compared to conventional methods employed to identify such points.

20 Claims, 14 Drawing Sheets

PARTITIONING ALGORITHM

COMPUTE LOWER AND UPPER BOUND FLOWCHART

COMPUTE LOWER AND UPPER BOUND FLOWCHART

COMPUTE LOWER AND UPPER BOUND FLOWCHART

COMPUTE LOWER AND UPPER BOUND FLOWCHART

COMPUTE CANDIDATE PARTITIONS FLOWCHART

COMPUTE CANDIDATE PARTITIONS FLOWCHART

COMPUTE CANDIDATE PARTITIONS FLOWCHART

GENBATCH PARTITION FLOWCHART

COMPUTE OUTLIERS FLOWCHART

COMPUTE OUTLIERS FLOWCHART

COMPUTE OUTLIERS FLOWCHART

METHOD FOR IDENTIFYING OUTLIERS IN LARGE DATA SETS

FIELD OF THE INVENTION

The present invention relates to data sets, and more particularly to a method for identifying particular data points of interest in a large data set.

BACKGROUND OF THE INVENTION

The ability to identify particular data points in a data set that are dissimilar from the remaining points in the set has useful applications in the scientific and financial fields. For example, identifying such dissimilar points, which are commonly referred to as outliers, can be used to identify abnormal usage patterns for a credit card to detect a stolen card. The points in the abnormal usage pattern associated with the unauthorized use of the stolen card are deemed outliers with respect to the normal usage pattern of the cardholder.

Conventional methods employed for identifying outliers typically use an algorithm which relies upon a distance-based definition for outliers in which a point p in a data set is an outlier if no more than k points in the data set are at a distance of d or less from the point p. The distance d function can be measured using any conventional metric.

Although, methods which employ the aforementioned conventional distance-based definition of outliers can be used to identify such points in large data sets, they suffer from a significant drawback. Specifically, they are computationally expensive since they identify all outliers rather than ranking and thus identifying only particular outliers that are of interest. In addition, as the size of a data set increases, conventional methods require increasing amounts of time and hardware to identify the outliers.

SUMMARY OF THE INVENTION

A new method for identifying a predetermined number of outliers of interest in a large data set. The method uses a new definition of outliers in which such points are ranked in relation to their neighboring points. The method also employs new partition-based detection algorithms to partition the data points, and then compute upper and lower bounds for each partition. These bounds are then used to identify and eliminate those partitions that cannot possibly contain the predetermined number of outliers of interest. Outliers are then computed from the remaining points residing in the partitions that were not eliminated. The present method eliminates a significant number of data points from consideration as outliers, thereby resulting in substantial savings in computational expense compared to conventional methods employed to identify such points.

DETAILED DESCRIPTION OF THE INVENTION

Figure 1:
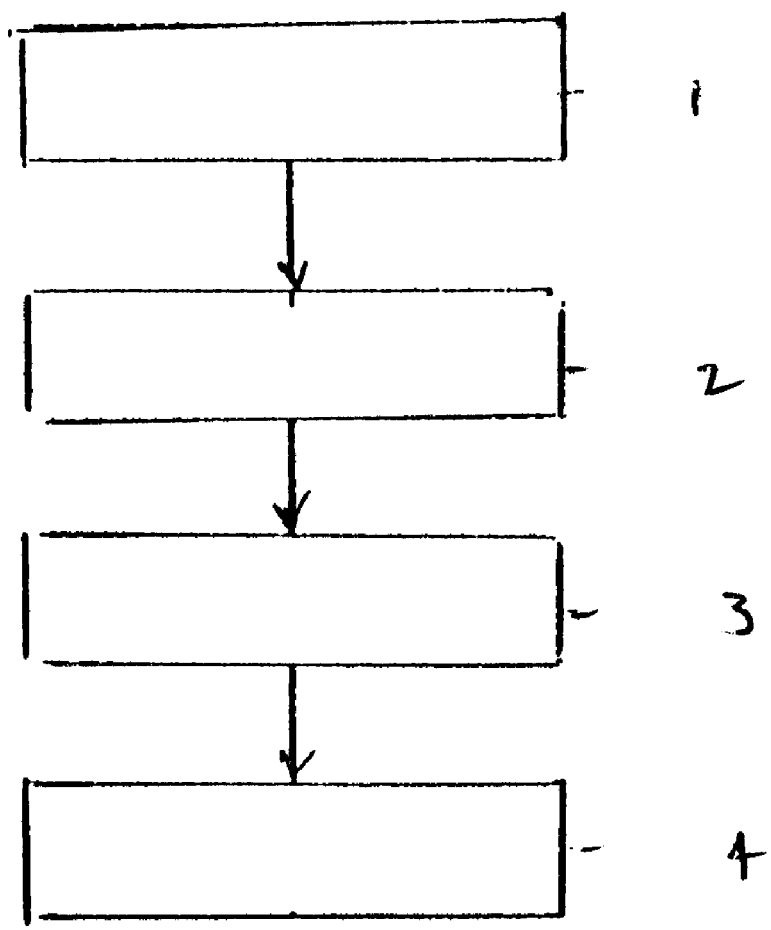
FIG. 1 shows a flow chart depicting the steps in an exemplary embodiment of a method for identifying a predetermined number of outliers of interest in a data set according to the present invention.
Figure 2:
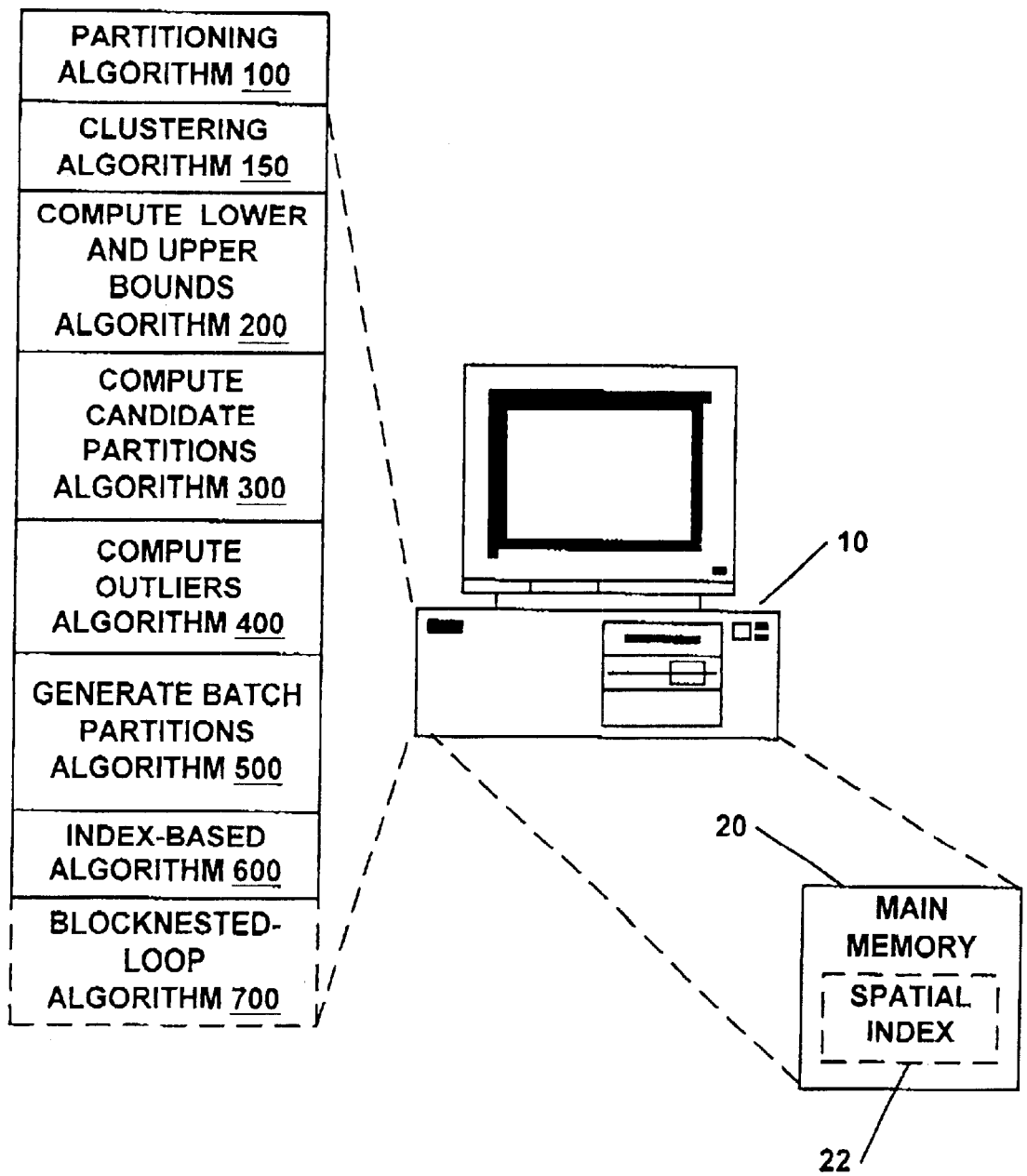
FIG. 2 shows a general block diagram of the computer for carrying out the method of the present invention.

The following detailed description relates to an exemplary embodiment of a method for identifying a predetermined number of outliers of interest in a large data set according to the present invention. The method utilizes both a new definition of outliers and new algorithms to identify such data points. The following terms will aid in understanding both the new definition and the new algorithms: k represents the number of neighbors of a data point p that is of interest; $D^k(p)$ represents the distance of point p to its $k^{th}$ nearest neighbor; n represents the total number of outliers of interest; N represents the total number of data points in a data set; $\delta$ represents the dimensionality of data points N; M represents the amount of memory available; MINDIST represents the minimum distance between a point or a minimum bounding rectangle (MBR) and another MBR; and MAXDIST represents the maximum distance between a point or an MBR and another MBR.

The new definition of outliers is based on determining the distance $D^k(p)$ of a point p to its $k^{th}$ nearest neighbor and then determining top n outliers, such that for a given a data set with N points and parameters n and k, an outlier can be defined as follows: a point p is a $D^k_n$, pronounced "dee-kay-en", outlier if no more than an n−1 other points in the data set have a higher value for $D^k$ than p. Thus, the top n points with the maximum $D^k$ values are deemed outliers. For example, points with larger values for $D^k(p)$ reside in more sparsely populated clusters, i.e., neighborhoods, of points and are thus more likely to be stronger outliers than points residing in more densely populated neighborhoods which have smaller values for $D^k(p)$.

The distance $D^k(p)$ can be measured using any metric or non-metric distance function. The new definition of outliers is not effected by k so long as n is selected to be a small in relation to N. As the value of n increases, so does the time and expense required to identify such outliers since more points must be evaluated. By ranking outliers, the present invention can discriminate between data points p of interest. For example, outliers with similar $D^k(p)$ distances which are ranked at the bottom of a grouping may not be true outliers and may thus be ignored. As described in more detail below, this new definition also enables the performance of conventional index-based and nested-loop algorithms 600 and 700 to be optimized to identify the top n outliers rather than just identifying all of the outliers.

A key technical tool employed in the present invention for determining which data points are outliers is the approximation of a set of points using their MBR. By computing lower and upper bounds on $D^k(p)$ for points in each MBR, MBRs can be identified and eliminated that cannot possibly contain $D^k(p)$ outliers. The computation of bounds for MBRs requires that the minimum and maximum distance between a point and an MBR and between two MBRs be defined.

In determining these upper and lower bounds, the square of the euclidean distance between a point or MBR and another MBR, rather than the euclidean distance itself, is used as the distance metric, thereby requiring fewer and thus less expensive computations. A point p in $\delta$-dimensional space is denoted by $[p_1, p_2, \ldots, p_\delta]$ and a $\delta$-dimensional rectangle R is denoted by the two endpoints of its major diagonal: $r=[r_1, r_2, \ldots, r_\delta]$ and $r'=[r'_1, r'_2, \ldots, r'_\delta]$ such that $r_i \leq r'_i$ for $1 \leq i \leq n$. The minimum distance between point p and rectangle R is denoted by MINDIST (p, R) such that every point in R is at a distance of at least MINDIST (p, R) from p. MINDIST (p, R) is defined as:

$$\text{MINDIST } (p, R) = \Sigma_{i=1}^{\delta} x_i^2,$$

where $$x_i = \begin{cases} r_i - p_i & \text{if } p_i < r_i \\ p_i - r'_i & \text{if } r'_i < p_i \\ 0 & \text{otherwise} \end{cases} \quad (1)$$

The maximum distance between point p and rectangle R is denoted by MAXDIST (p, R), such that no point in R is at a distance that exceeds MAXDIST (p, R) from point p. MAXDIST (p, R) is defined as:

$$\text{MAXDIST } (p, R) = \Sigma_{i=1}^{\delta} x_i^2,$$

where $$x_i = \begin{cases} r'_i - p_i & \text{if } p_i < r_i + r'_i/2 \\ p_i - r_i & \text{otherwise} \end{cases} \quad (2)$$

The minimum and maximum distance between two MBRs R and S is defined by the endpoints of their major diagonals, r, r' and s, s', respectively. The minimum distance between MBRs R and S is denoted by MINDIST(R, S), wherein every point in R is at a distance of at least MINDIST(R, S) from any point in S and vice-versa. Similarly, the maximum distance between MBRs R and S is denoted by MAXDIST(R, S). MINDIST(R, S) and MAXDIST(R, S) are defined using the following two equations:

$$\text{MINDIST } (R, S) = \Sigma_{i=1}^{\delta} x_i^2,$$

where $$x_i = \begin{cases} r_i - s'_i & \text{if } s'_i < r_i \\ p_i - r'_i & \text{if } r'_i < p_i \\ 0 & \text{otherwise} \end{cases} \quad (3)$$

$$\text{MAXDIST } (R, S) = \Sigma_{i=1}^{\delta} x_i^2,$$

where $$x_i = \max \{|s'_i - r_i|, |r'_i - s_i|\} \quad (4)$$

The partition-based algorithms used in the present invention eliminate points whose distances from their $k^{th}$ nearest neighbors are so small that they are not in the top n outliers. Such pruning results in substantial improvements in performance speed due to savings in both computation time and required memory compared to conventional methods which calculate $D^k_n$ for all points p in N.

FIG. 1 shows a flowchart depicting the steps in an exemplary embodiment of the method for identifying a predetermined number of outliers of interest in a data set according to the present invention. At step 1, the points in a data set are partitioned using a clustering algorithm 150. At step 2, upper and lower bounds are calculated for the partitions. At step 3, candidate partitions which possibly contain outliers of interest are identified. At step 4, the top n outliers are identified from the points in the candidate partitions. These four steps are implemented using software which is stored on a single computer 10, or stored on a server on a network. Each of these four steps are described in greater detail below.

1. Partition Data Points

A clustering algorithm 150 is used to partition the data points. Any one of a number of conventional clustering algorithms 150 can be used. Since N can be large, it is desirable to use clustering algorithms 150 that can process large data sets. One such algorithm 150 is the BIRCH algorithm. See Tian Zhang, Raghu Ramakrishnan and Miron Livny, *BIRCH: An Efficient Data Clustering Method For Very Large Databases, Proceedings of the ACM SIGMOD Conference on Management of Data*, pages 103–114, Montreal, Canada, June 1996. The clustering algorithms 150 then eliminate the partitions that it determines do not contain outliers. To enable such partitions to be effectively eliminated, it is desirable to partition the data set such that points which are close together are assigned to the same partition.

Since the number of partitions created is usually smaller than the number of points n, pruning the partitions, which is performed at the granularity of partitions rather than points, eliminates a significant number of points as outlier candidates. Consequently, the $k^{th}$ nearest neighbor computations are performed for very few points, thereby speeding up the computation of outliers.

Figure 3:
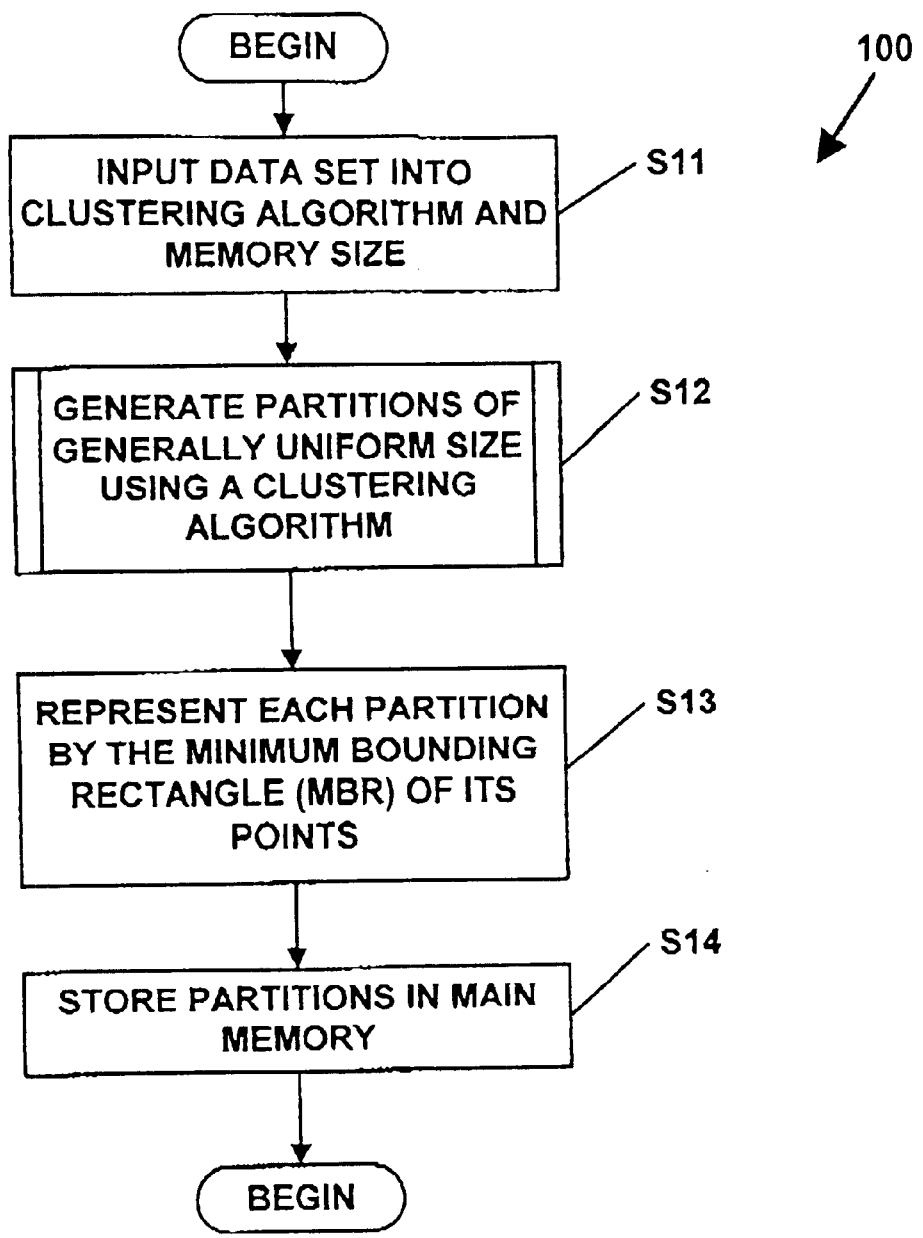
FIG. 3 shows a general flowchart of the partitioning algorithm in accordance with the present invention.
Figure 4A:
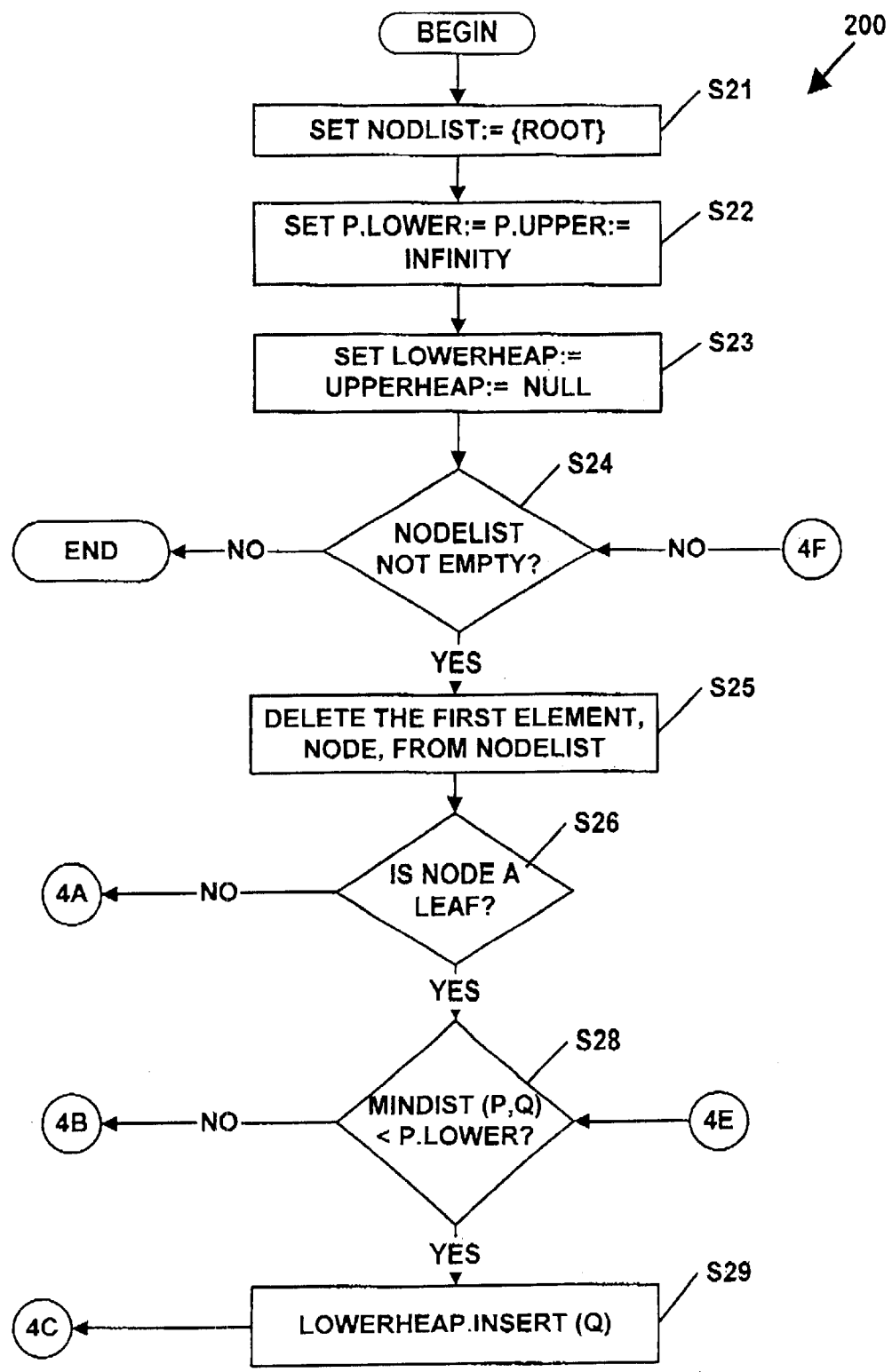
FIGS. 4A–4D show a general flowchart of the algorithm to compute lower and upper bounds in accordance with the present invention.
Figure 4B:
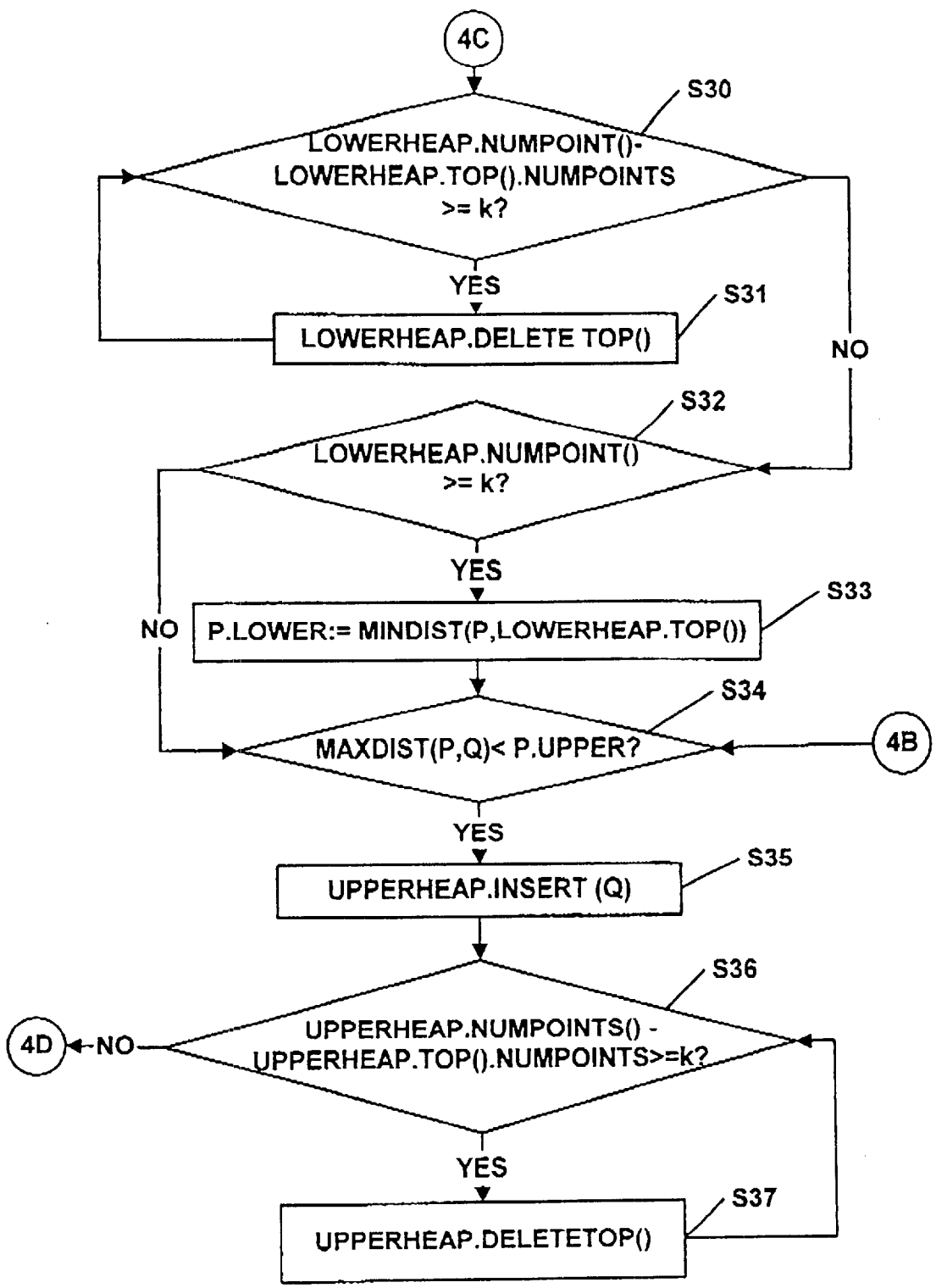
Figure 4C:
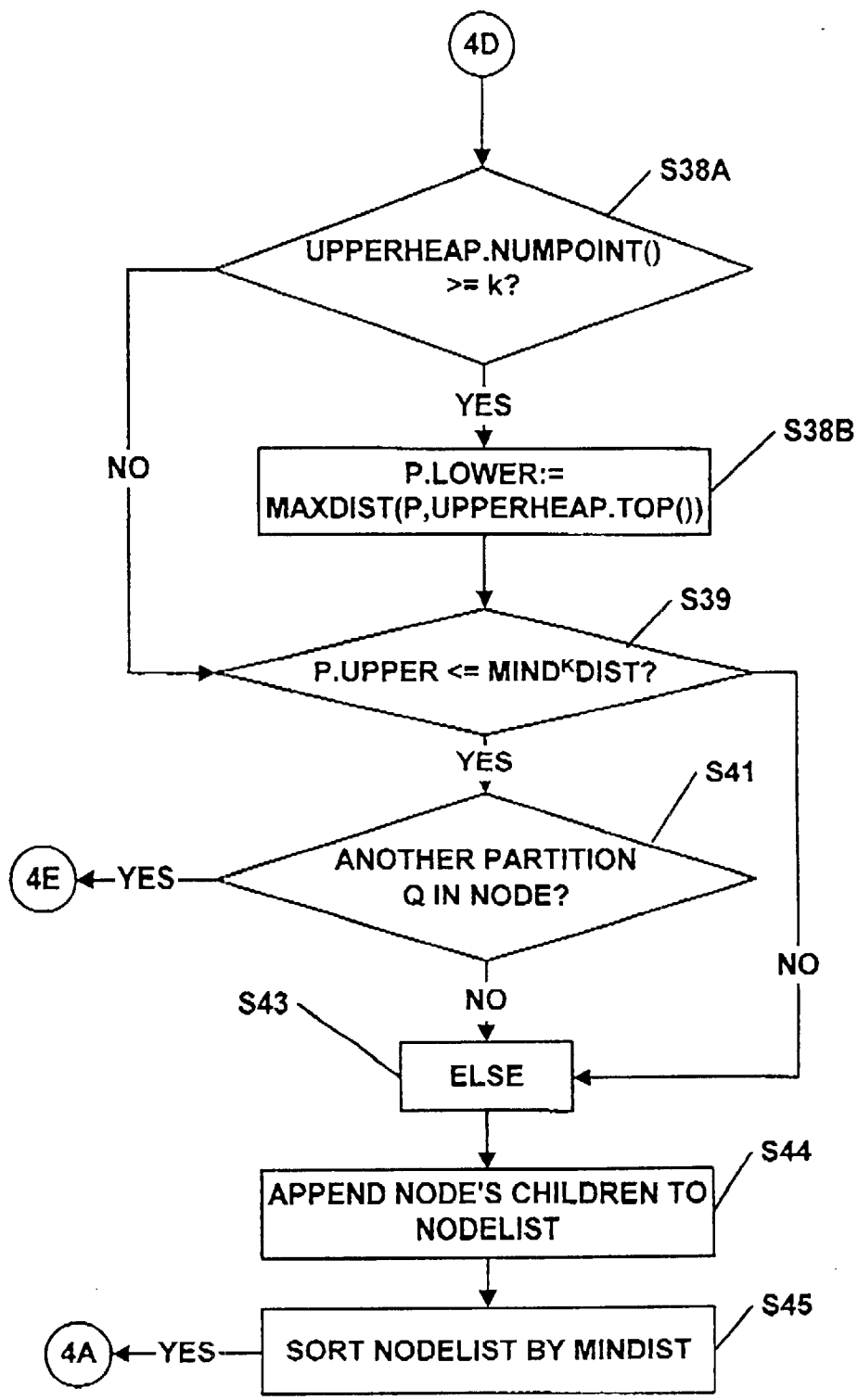
Figure 4D:
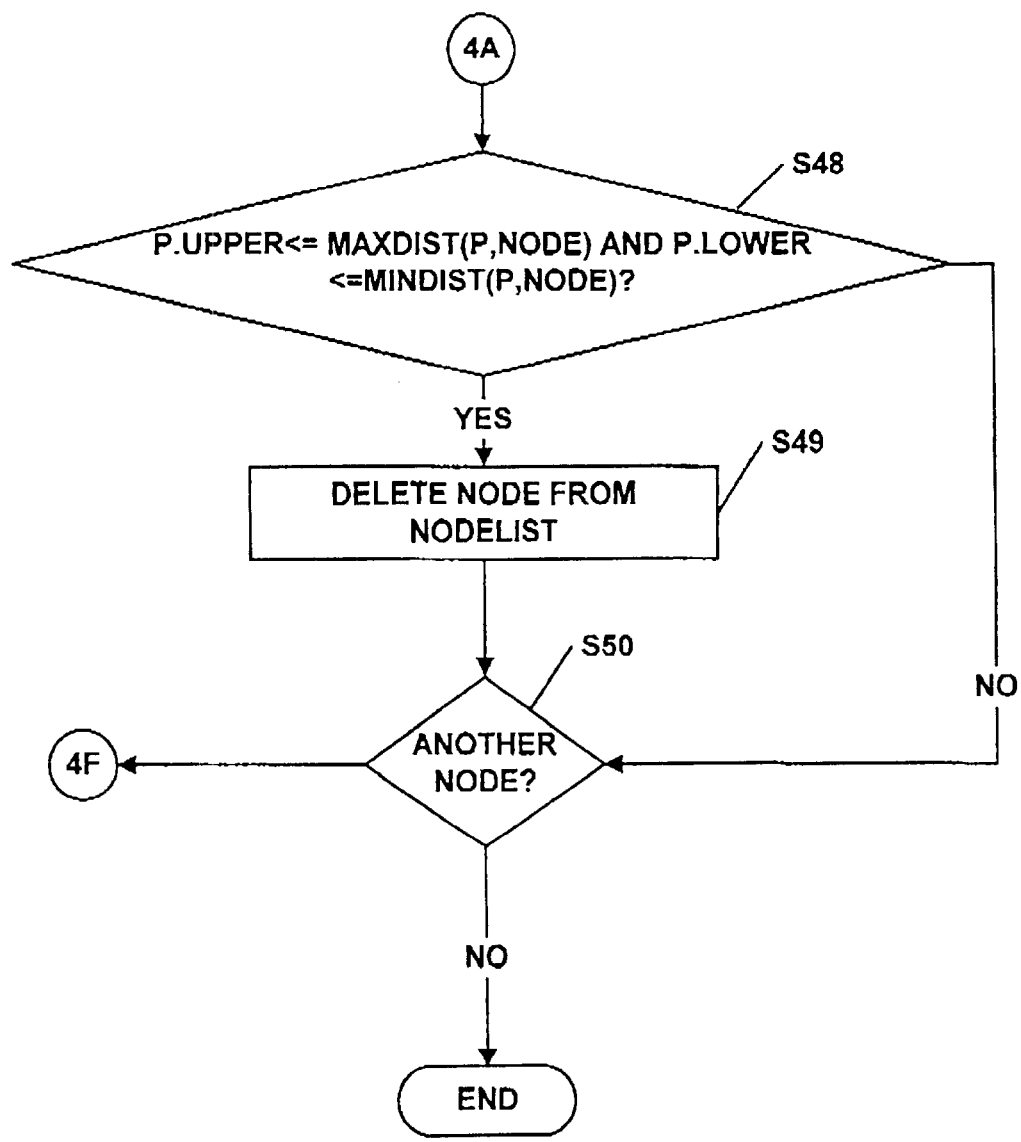

Referring now to FIG. 3, the partitioning algorithm 100 for partitioning the data points is shown. The main memory size M and the points in the data set are given as inputs to the BIRCH algorithm at Step S11 which generates a set of clusters, i.e. partitions, of generally uniform size at Step S12 that are smaller than and can thus be stored in main memory 20 at Step S14. By controlling the memory size M input to the BIRCH algorithm, the number of partitions generated can be controlled. Each partition is represented by the MBR at Step S13 for its points. The MBRs for partitions may overlap.

2. Compute Upper and Lower Bounds for Partitions

Referring now to FIGS. 4A–4D, the algorithm computeLowerUpper 200 which is set forth below is used to compute lower and upper bounds, stored in P.lower and P.upper, respectively, on $D^k$ for points p in each partition P, wherein for every point $p \in P$, P.lower $\leq D^k(p) \leq$ P.upper.

---

Procedure computeLowerUpper (Root, P, k, minD$^k$Dist)
begin
1.    nodeList: = {Root}
2.    P.lower: = P.upper: = ∞

-continued

```
3.      lowerHeap: = upperHeap: = Ø
4.      while nodeList is not empty do
5.              delete the first element, Node, from nodeList
6.              if (Node is a leaf) {
7.                      for each partition Q in Node {
8.                              if (MINDIST (P, Q) < P.lower) {
9.                                      lowerHeap.insert (Q)
10.                                     while lowerHeap.numPoints() − lowerHeap.top ().numPoints ≧ k do
11.                                             lowerHeap.deleteTop()
12.                                     if (lowerHeap.numPoints() ≧ k) P.lower: = MINDIST (P, lowerHeap.top())
13.                             }
14.                             if (MAXDIST (P, Q) < P.upper) {
15.                                     upperHeap.insert (Q)
16.                                     while upperHeap.numPoints() − upperHeap.top ().numPoints ≧ k do
17.                                             upperHeap.deleteTop()
18.                                     if (upperHeap.numPoints() ≧ k) P.lower: = MAXDIST (P, upperHeap.top())
19.                                     if (P.upper ≦ minD$^k$Dist) return
20.                             }
21.                     }
22.             }
23.             else }
24.                     append Node's children to nodeList
25.                     sort nodeList by MINDIST
26.             }
27.     for each Node in nodeList do
28.             if (P.upper ≦ MAXDIST (P, Node) and P.lower ≦ MINDIST (P, Node)
29.                     delete Node from NodeList
30.     }
end.
```

The lower and upper bounds for a particular partition P are determined by finding the l partitions closest to P with respect to MINDIST and MAXDIST such that the number of points in $P_1, \ldots, P_l$ is at least k, at Steps S28, S29, S30, S31, S32, S33 and Steps S34, S35, S36, S37, S38A, S38B. Since the partitions can be stored in main memory 20, a main memory index can be used to find the l partitions closest to P. For each partition, its MBR is stored in the main memory index 22.

The algorithm computeCandidatePartitions 300, which identifies candidate partitions and is set forth and described below, keeps track of minD$^k$Dist which is a lower bound on D$^k$ for an outlier, and passes this value to the algorithm computeLowerUpper 200 to optimize the computation of the bounds for a partition P. If P.upper for partition P is less than minD$^k$Dist, then it cannot contain outliers and computation of its bounds is terminated, at Steps S39 and continues with Steps S43, S44 and S45. At Step S44, the node's childer are appended to the nodelist. At Step S45, the nodelist is sorted by mindist.

The algorithm computeCandidatePartitions 300 uses three data structures to compute lower and upper bounds: a list nodeList of nodes in the main memory index 22 containing partitions that still need to be searched, at Steps S24, S25, S26, S41, S48, S49 and S50; and two heaps, each containing the closest partitions to P such that the total number of points in them is at least k. This algorithm stores partitions in two heaps, lowerHeap and upperHeap in the decreasing order of MINDIST and MAXDIST from P, respectively, such that partitions with the largest values of MINDIST and MAXDIST appear at the top of the heaps, at Steps S30, S31 and S36, S37.

Referring still to FIGS. 4A–4D, at Step S21 nodelist is set to root. Step S21 is followed by Step S22 where P.lower and P.upper are set to infinity. Step S23 sets lowerheap and upperheap to null.

3. Identify Candidate Partitions

The algorithm computeCandidatePartitions 300, which is set forth below, is used to identify the candidate partitions that can potentially contain outliers from among the set of all partitions Pset, and to then eliminate the remaining partitions.

```
Procedure computeCandidatePartitions (Pset, k, n)
begin
1.      for each partition P in Pset do
2.              insertIntoIndex (Tree, P)
3.      partHeap: = Ø
4.      minD$^k$Dist: = 0
5.      for each partition P in Pset do {
6.              compute LowerUpper (Tree.Root, P, k, minD$^k$Dist)
7.              if (P.lower > minD$^k$Dist) {
8.                      partHeap.insert (P)
9.                      while partHeap.num.Points() − partHeap.top().numPoints() ≧ n do
10.                             partHeap.deleteTop()
11.                     if partHeap.num.Points() ≧ n) minD$^k$Dist: = partHeap.top().lower
12.             }
13.     }
```

-continued

```
14.     candSet: = Ø
15.     for each partition P in Pset do
16.         if (P.upper ≥ minD^kDist) {
17.             candSet: = candSet ∪ {P}
18.             P.neighbors: = {Q: Q ∈ Pset and MINDIST (P, Q) ≤ P.upper}
19.         }
20.     return candSet
end.
```

Figure 5A:
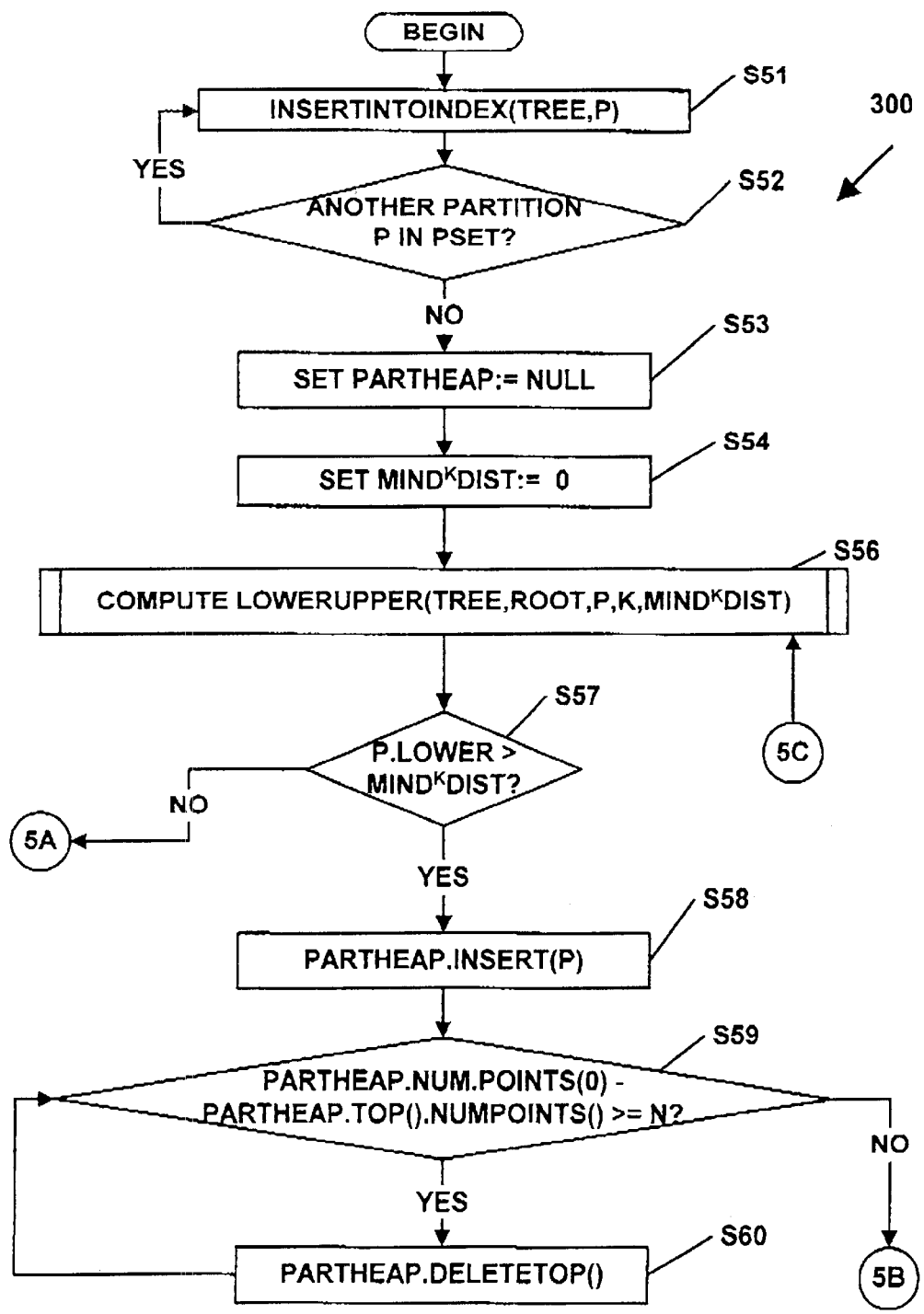
FIGS. 5A–5C show a general flowchart of the algorithm to compute candidate partitions in accordance with the present invention.
Figure 5B:
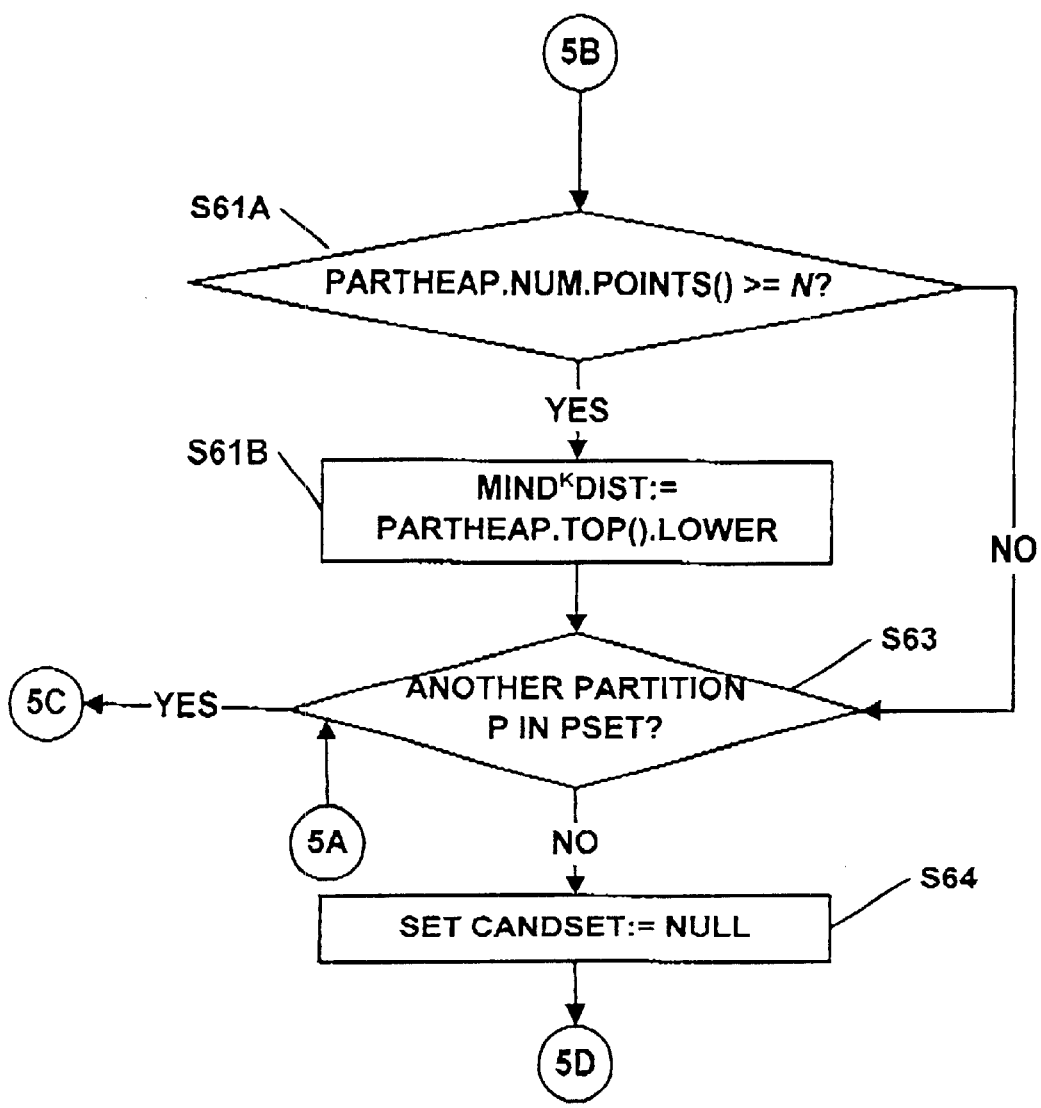
Figure 5C:
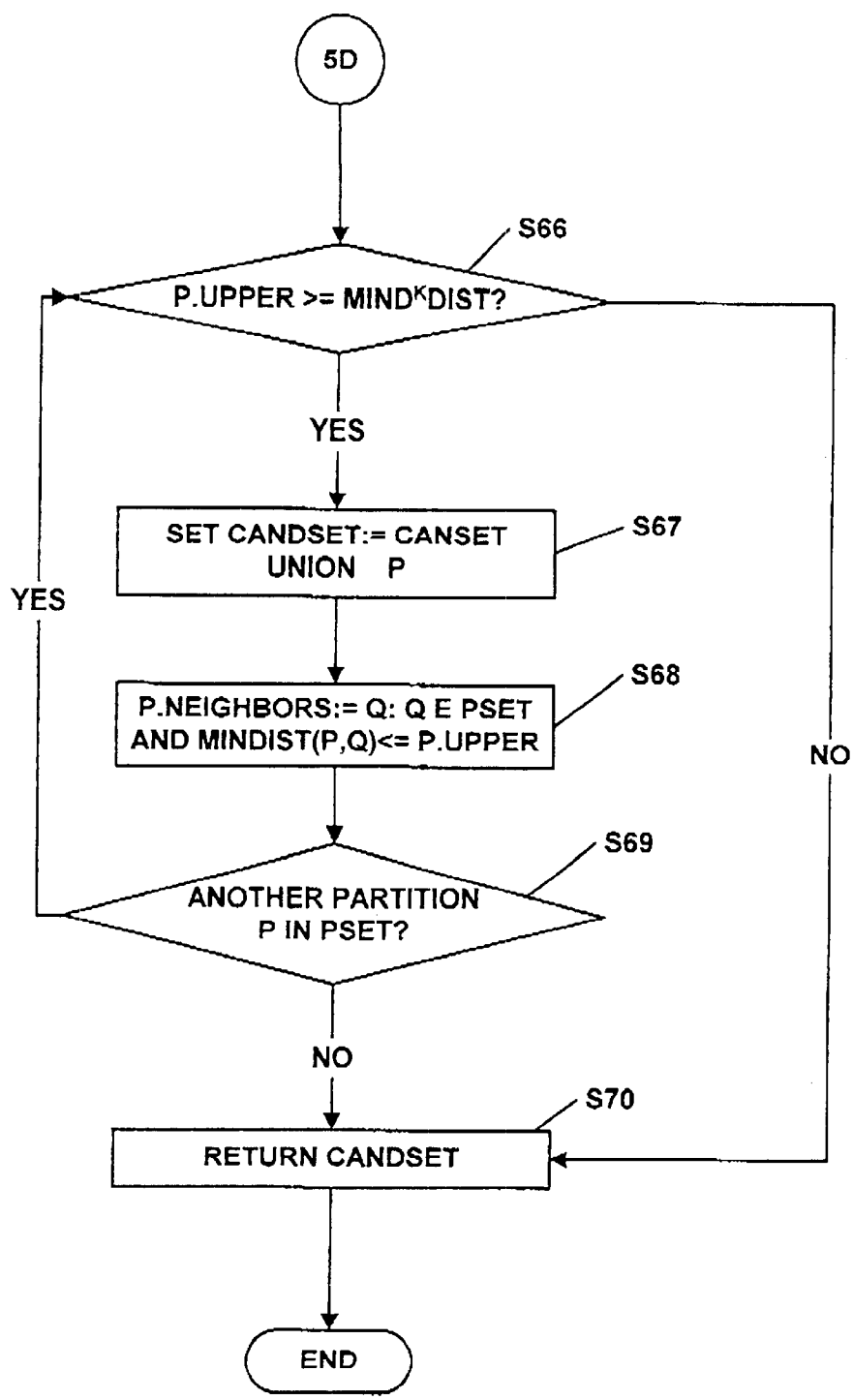
Figure 6:
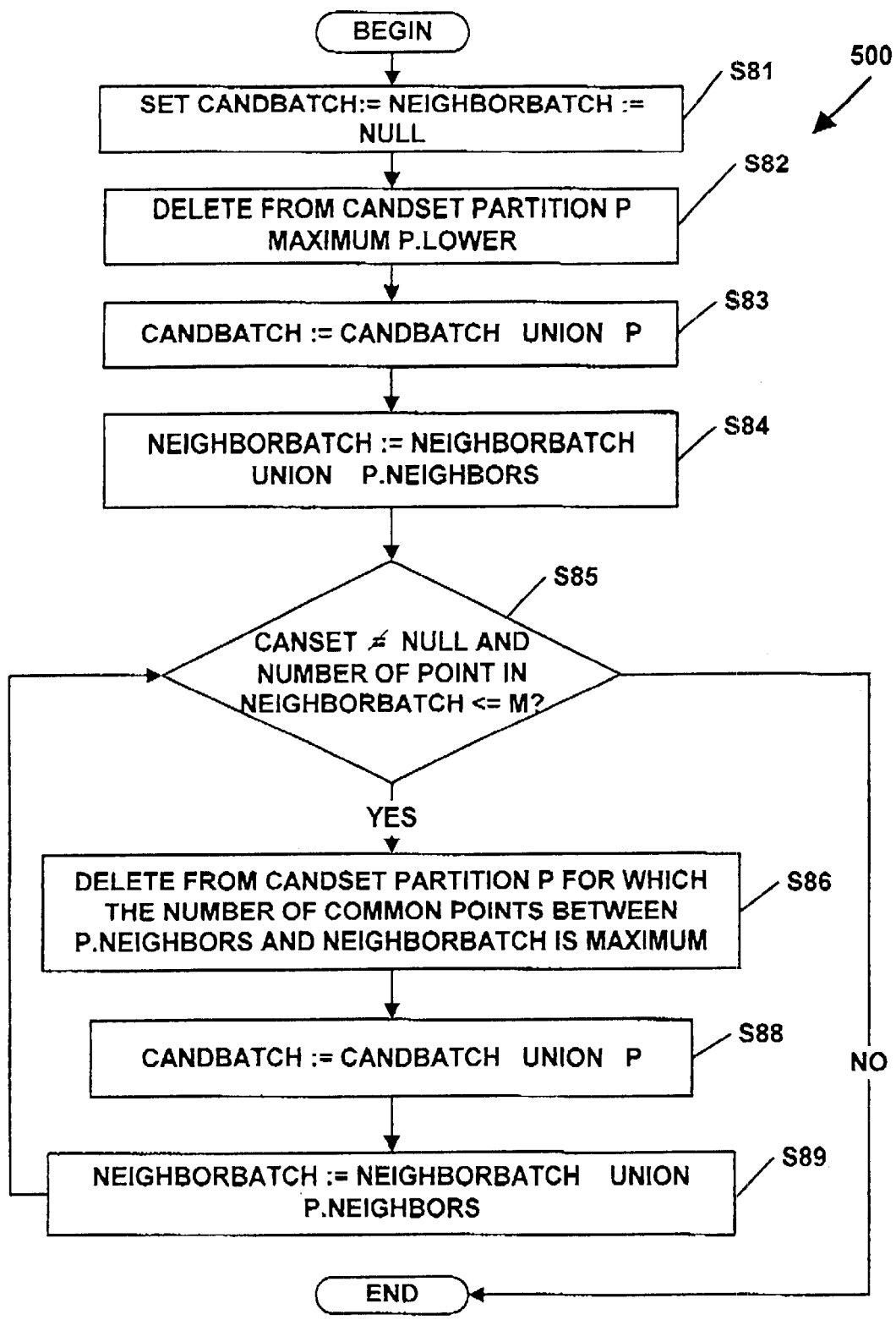
FIG. 6 shows a general flowchart of the algorithm to generate batch partitions in accordance with the present invention.
Figure 7A:
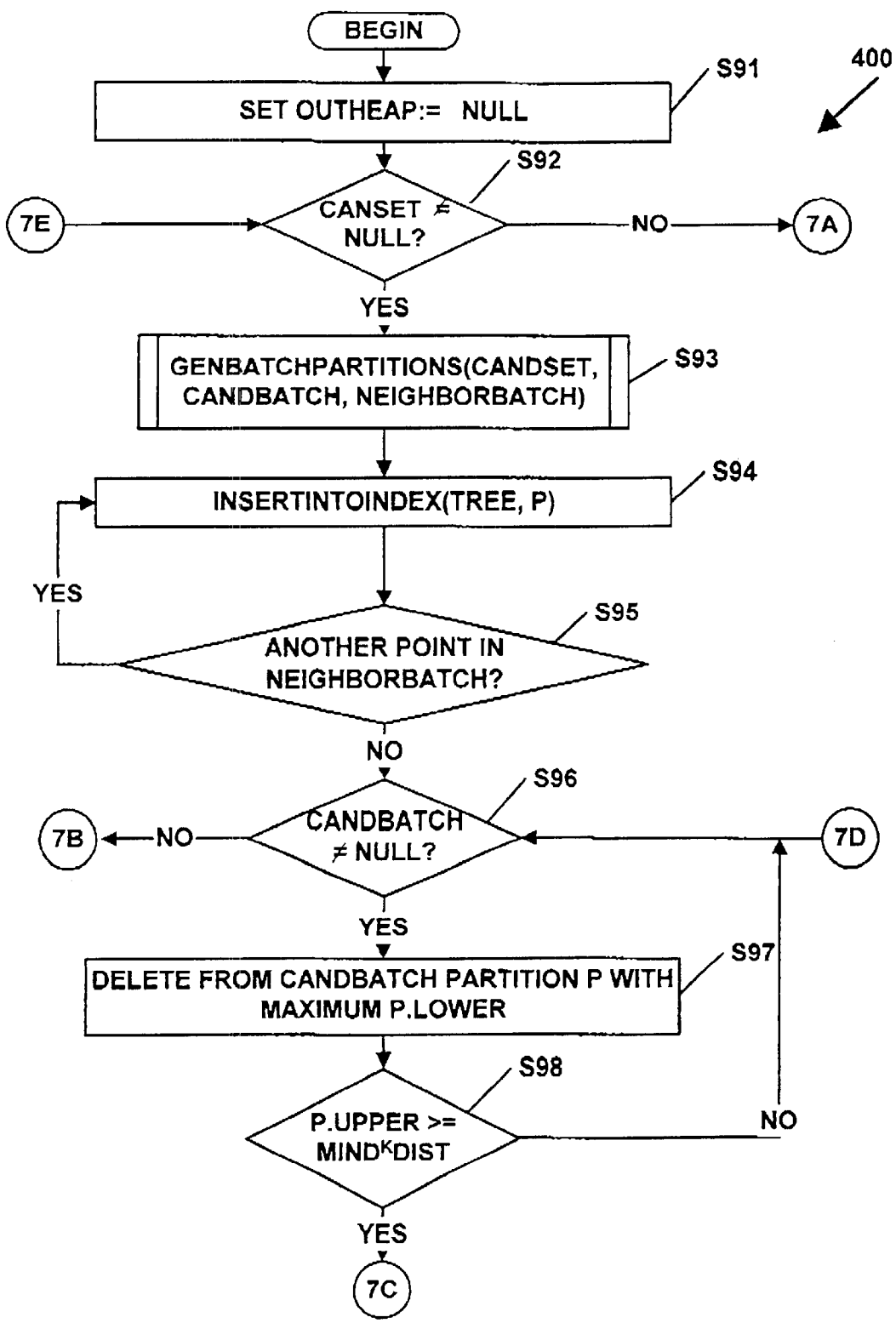
FIGS. 7A–7C show a general flowchart of the algorithm to compute outliers in accordance with the present invention.
Figure 7B:
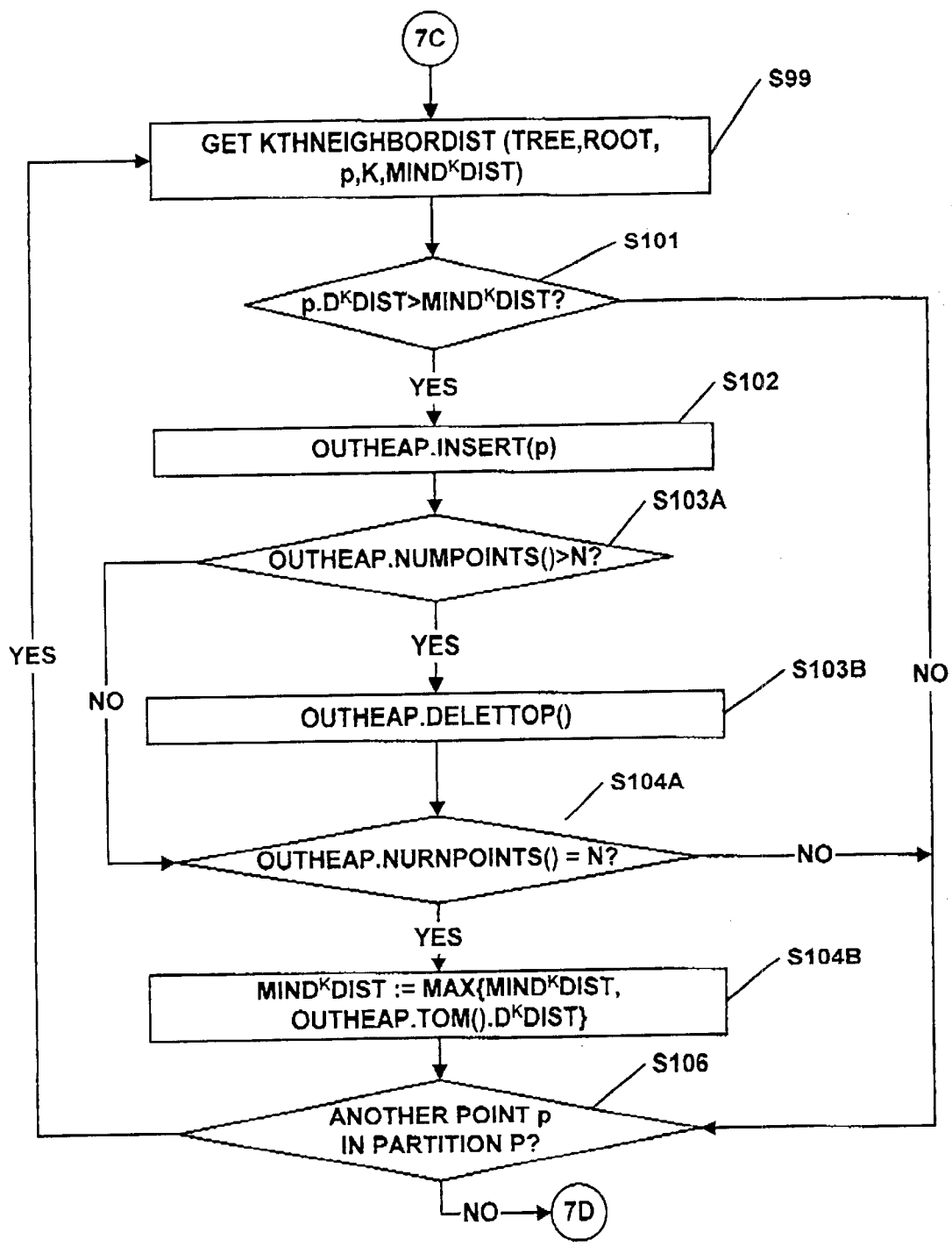
Figure 7C:
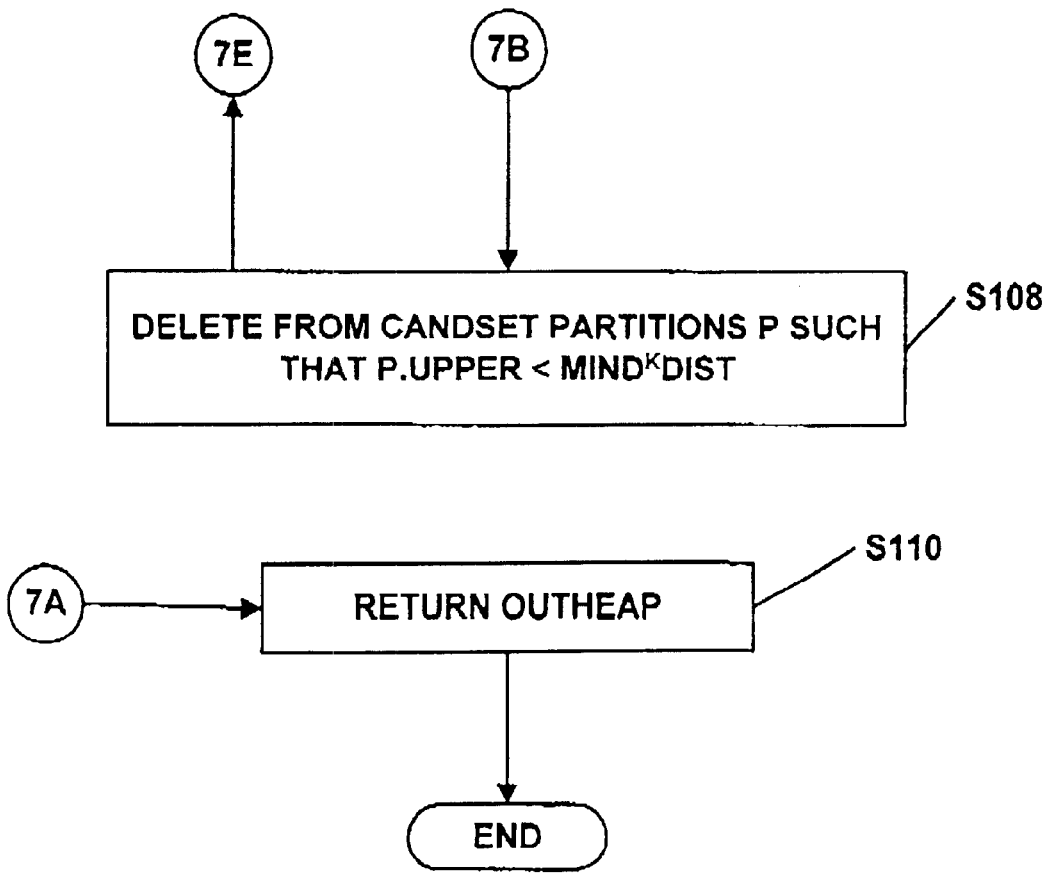

Referring now to FIGS. 5A–5C, the lower and upper bounds that were previously computed are used to first estimate the lower bound $minD^kDist$ and then a partition P is a candidate only if $P.upper \geq minD^kDist$, as determined at Steps S66, S67. The lower bound $minD^kDist$ can be computed using the P.lower values for the partitions, wherein if $P_1, \ldots, P_l$ represents the partitions with the maximum values for P.lower that contain at least n points, then $minD^kDist = min \{P_i.lower: \leq i < 1\}$.

The algorithm computeCandidatePartitions 300 inserts each partition in Pset into memory index 22 at Steps S51 and S52. Furthermore, the algorithm computeCandidatePartitions 300 sets partHeap to null and the $minD^kDist$ equal to 0, at Steps S53 and S54.

The algorithm computeCandidatePartitions 300 stores the partitions with the largest P.lower values and containing at least n points in the heap partHeap. These partitions are stored in increasing order of P.lower in partHeap and $minD^kDist$ is thus equal to P.lower for the partition P at the top of partHeap. By maintaining $minD^kDist$, it can be passed as a parameter to computeLowerUpper algorithm 200 at Step S56 of this algorithm and the computation of bounds for a partition P can be terminated if P.upper for that partition falls below $minD^kDist$. If, for a partition P, P.lower is greater than the current value of $minD^kDist$, then P.lower is inserted into partHeap and the value of $minD^kDist$ is appropriately adjusted at Steps S57, S58, S59, S60, S61A, S61B and S63 of this algorithm.

At Step S64, candset is set to null. In the for loop at Steps S66, S67, S68 and S69 of this algorithm, the set of candidate partitions candSet is identified, and for each candidate partition P, partitions Q that can potentially contain the $k^{th}$ nearest neighbor for a point in P are added to P.neighbors which contain P. At Step S70, the candset is returned.

4. Identify n Outliers of Interest

The top $D^k_n$ outliers are computed from the points in the candidate partitions candSet. If the points in all the candidate partitions and their neighbors are smaller than main memory size M, then all the points are stored in a main memory spatial index 22. A conventional index-based algorithm 600 is then used to compute the n outliers by probing the index to compute $D^k$ values only for points belonging to the candidate partitions. Since both the size of the index and the number of candidate points will typically be smaller than the total number of points in the data set, then the outliers of interest will be identified more quickly by probing the candidate partitions rather than by executing the index-based algorithm 600 for the entire data set of points.

If all of the candidate partitions and their neighbors exceed the main memory size M, then the candidate partitions must be processed in batches. In each batch, a subset of the remaining candidate partitions that along with their neighbors are smaller than main memory size M is selected for processing. The selection of candidate partitions for a batch is performed by the algorithm genBatchPartitions 500 which is set forth below.

```
Procedure genBatchPartitions(candSet, candBatch, neighborBatch)
begin
1.      candBatch: = neighborBatch: = Ø
2.      delete from candSet partition P with maximum P.lower
3.      candBatch: = candBatch ∪ P
4.      neighborBatch: = neighborBatch ∪ P.neighbors
5.      while canSet ≠ Ø and number of points in neighborBatch ≤ M do {
6.          delete from candSet partition P for which the number of common points between
7.              P.neighbors and neighborBatch is maximum
8.          candBatch: = candBatch ∪ P
9.          neighborBatch: = neighborBatch ∪ P.neighbors
10.     }
end.
```

For each candidate partition P, P.neighbors denotes the neighboring partitions of P, which are all the partitions within distance P.upper from P. Points belonging to neighboring partitions of P are the only points that need to be examined to identify $D^k$ for each point in P. The set of candidate partitions is an input parameter to the algorithm, while the candidate partitions for a batch and their neighbors are returned in candBatch and neighborBatch, respectively.

At Step S81, the algorithm genBatchPartitions 500 sets the candbatch and the neighborbatch equal to null. At Step S83, candbatch is set equal to candbatch union partition P. At Step S84, neighborbatch is set equal to neighborbatch union P.neighbors.

To identify the $D^k_n$ outliers, the candidate partition with the maximum value for P.lower must first be selected at Step S82 of the algorithm genBatchPartitions 500. This candidate partition is then used to select subsequent partitions at Steps S85, S86, S88, and S89 of the algorithm 500. For successive partitions, partitions are selected which have a large overlap with the previously selected partitions. The rationale for doing so is that it minimizes the number of batches in which a partition participates. Since processing a partition in a batch requires that all of the points in the batch to be first read from disk and then to be inserted into the main memory index 22, both of which can be expensive, reducing the number of times these steps are performed for a partition results in substantial performance improvements. In addition, processing partitions with large overlaps in a batch guarantees that the points processed in a single batch are relatively close to each other. As a result, computation of $D^k$ for candidate points becomes more efficient. The process of adding candidate partitions to the batch is repeated until the number of points in the selected partitions exceeds M.

The algorithm computeOutliers 400 which is set forth below is then used to identify the $D^k_n$ outliers from the candidate partitions in candSet computed by the algorithm computeCandidatePartitions 300.

compute the to compute the $D^k_n$ outliers from the candidate partitions in candSet generated by the algorithm compute-CandidatePartitions 300. In a block nested-loop algorithm 700, if the points in candSet fit in memory, then they are loaded into memory and a single pass is made over their neighboring partitions. Otherwise, genBatchPartitions 500 is used to generate candBatch. The candidate points that are processed during a batch. The only difference is that instead of requiring neighborBatch to fit in main memory, only the c points in candBatch and c heaps are required, one heap for each point p in candBatch containing the distances of p's k nearest neighbors, to fit in memory.

Points in candBatch and their heaps are stored in memory, and a single pass is made over neighborBatch which is

```
Procedure computeOutliers(candSet, k, n, minDkDist)
begin
1.      outheap := ∅
2.      while candset ≠ ∅ do {
3.          genBatchPartitions(candSet, candbatch, neighborbatch)
4.          for each point p in neighborbatch
5.              insertIntoindex(Tree, p)
6.          while candbatch ≠ ∅ do{
7.              delete from candbatch partition P with maximum P.lower
8.              if (P.upper ≧ minDkDist)
9.                  for each point p in partition P do {
10.                     getKthNeighborDist(Tree.Root, p, k, minDkDist)
11.                     if (p.DkDist > minDkDist) {
12.                         outHeap.insert(p)
13.                         if (outHeap.numPoints() > n) outHeap.deleteTop()
14.                         if (outHeap.numPoints() = n) minDkDist := max{minDkDist, outHeap.top().DkDist }
15.                     }
16.                 }
17.         }
18.         delete from candset partitions P such that P.upper < minDkDist
19.     }
20.     return outheap
end.
```

The algorithm computeOutliers 400 uses a conventional index-based algorithm 600 and has as an input parameter the $minD^kDist$ value computed by the algorithm computeCandidatePartitions 300 to identify the candidate partitions. While being executing, the algorithm computeOutliers 400 keeps track of the top n outliers in outHeap and $minD^kDist$.

At Step S91, outheap is set equal to null.

Once the candidate partitions and their neighbors for a batch have been identified at Steps S93 and S92 of the algorithm computeOutliers 400, the points from neighborBatch are inserted into a main memory index at Steps S94 and S95. The while loop spanning Steps S96, S97, S98, S99, S101, S102, S103A, S103B, S104A, S104B and S106 executes the index-based algorithm 600 for points in the candidate partitions. The candidate partitions are evaluated in decreasing order of their P.lower values so that if the points with the highest $D^k$ values are found early, then more points can be eliminated later since $minD^kDist$ will converge earlier to the $D^k$ value for the nth outlier.

Since the value of $minD^kDist$ is continuously refined during the procedure, partitions whose P.upper value drops below $minD^kDist$ cannot contain any outliers and can thus be ignored at Steps S98 and S108. At Steps S99, S101, S102, S103A, S103B, S104A, S104B and S106, for every point in p, the procedure $getK^{th}NeighborDist$ is used to compute $D^k(p)$ and p is inserted into the outlier heap if it is a stronger outlier than the current nth outlier in outHeap. At Step S110, the outlier heap is returned.

Alternatively, a conventional block nested-loop algorithm can be used in place of an index-based algorithm 600 to disk-resident. For each point q in neighborBatch, if the distance between a point p in candBatch and q is smaller than p's distance from its current $k^{th}$ nearest neighbor, then q replaces p's $k^{th}$ neighbor. Also, $minD^kDist$, the lower bound on $D^k$ for an outlier, is maintained during execution and used to eliminate points and partitions whose $k^{th}$ nearest neighbor is known to be at a distance of less than $minD^kDist$ as for the index-based algorithm 600.

The partition-based algorithms of the present invention scale well with respect to both data set size and data set dimensionality. They also perform more than an order of magnitude better than conventional index-based and nested-loop algorithms.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A computer implemented method embedded in a recordable media for identifying a predetermined number of outliers of interest in a data set, comprising the steps of:

partitioning a plurality of data points in the data set into a plurality of partitions;

computing lower and upper bounds for each one of the plurality of partitions to identify those partitions that cannot possibly contain the predetermined number of outliers of interest;

identifying a plurality of candidate partitions from the plurality of partitions, wherein each one of the plurality of candidate partitions possibly contains at least one of a predetermined number of outliers of interest, wherein the predetermined number of outliers of interest are included within the plurality of data points in the data set; and identifying the predetermined number of outliers of interest from the plurality of candidate partitions wherein the data set has N data points and the predetermined number of outliers of interest is n which each have k neighboring data points, a data point p is one of the predetermined number of outliers of interest n if no more than n−1 other points in the data set reside at greater distances from the k neighboring data point than data point p.

2. The method according to claim 1, wherein the partitioning step of the plurality of data points in the data set are partitioned using a clustering algorithm.

3. The method according to claim 1, wherein the computing step includes:

for each one of the plurality of partitions, calculating a distance of at least one neighboring data point from the plurality of data points in the partition, the lower bound being the smallest distance from the at least one neighboring data point to a first one of the plurality of data points in the partition and the upper bound being the largest distance from the at least one neighboring data point to a second one of the plurality of data points in the partition.

4. The method according to claim 3, wherein:

for the predetermined number of outliers of interest, a number of partitions having the largest lower bound values are selected such that the number of data points residing in such partitions is at least equal to the predetermined number of outliers of interest;

the identifying of the plurality of candidate partitions includes identifying which of the candidate partitions are comprised of those partitions having upper bound values that are greater than or equal to the smallest lower bound value of the number of partitions; and the non-candidate partitions are comprised of those partitions having upper bound values that are less than the smallest lower bound value of the number of partitions, the non-candidate partitions being eliminated from consideration because they do not contain the at least one of the predetermined number of outliers of interest.

5. The method according to claim 1, wherein the candidate partitions are smaller than a main memory, and further comprising the step of:

storing all of the data points in the candidate partitions in a main memory spatial index; and identifying the predetermined number of outliers of interest using an index-based algorithm which probes the main memory spatial index.

6. The method according to claim 1, wherein the candidate partitions are larger than a main memory, the partitions are processed in batches such that the overlap between each one of the partitions in a batch is as large as possible so that as many points as possible are processed in each batch.

7. The method according to claim 6, wherein each one of the batches is comprised of a subset of the plurality of candidate partitions, the subset being smaller than the main memory.

8. The method according to claim 6, wherein the predetermined number of outliers of interest are selected from the batch processed candidate partitions, the predetermined number of outliers of interest being those data points residing the farthest from their at least one neighboring data point.

9. The method according to claim 8, wherein the step of identifying the predetermined number of outliers of interest uses an index-based algorithm.

10. The method according to claim 8, wherein the step of identifying the predetermined number of outliers of interest uses a block nested-loop algorithm.

11. The method according to claim 1, wherein:

the partitioning step includes calculating a minimum bounding rectangle MBR for each one of the plurality of data points in the data set; and the computing step of the lower and upper bounds being computed for each one of the data points in the MBR.

12. The method according to claim 11, wherein the minimum distance between a point p and an MBR R is denoted by MINDIST (p, R) defined as MINDIST (p, R)=$\Sigma^{\delta}_{i=1} x^2_i$, wherein $$x_i = \begin{cases} r_i - p_i & \text{if } p_i < r_i \\ p_i - r'_i & \text{if } r'_i < p_i \\ 0 & \text{otherwise,} \end{cases}$$

and wherein every point in MBR R is at a distance of at least MINDIST (p, R) from point p; the point p in δ-dimensional space is denoted by $[p_1, p_2, \ldots, p_\delta]$; and the MBR R is a δ-dimensional rectangle R denoted by the two endpoints of its major diagonal: $r=[r_1, r_2, \ldots, r_\delta]$ and $r'=[r'_1, r'_2, \ldots, r'_\delta]$ such that $r_i \leq r'_i$ for $1 \leq i \leq n$.

13. The method according to claim 11, wherein the maximum distance between a point p and an MBR R is denoted by MAXDIST (p, R) defined as MAXDIST (p, R)=$\Sigma^{\delta}_{i=1} x^2_i$, wherein $$x_i = \begin{cases} r'_i - p_i & \text{if } p_i < r_i + r'_i/2 \\ p_i - r_i & \text{otherwise,} \end{cases}$$

and wherein no point in MBR R is at a distance that exceeds MAXDIST (p, R) from the point p; the point p in δ-dimensional space is denoted by $[p_1, p_2, \ldots, p_\delta]$; and the MBR R is a δ-dimensional rectangle R denoted by the two endpoints of its major diagonal: $r=[r_1, r_2, \ldots, r_\delta]$ and $r'=[r'_1, r'_2, \ldots, r'_\delta]$ such that $r_i \leq r'_i$ for $1 \leq i \leq n$.

14. The method according to claim 11, wherein the minimum distance between two MBRs R and S is denoted by MINDIST(R, S) defined as MINDIST (R, S)=$\Sigma^{\delta}_{i=1} x^2_i$, wherein $$x_i = \begin{cases} r_i - s'_i & \text{if } s'_i < r_i \\ p_i - r'_i & \text{if } r'_i < p_i \\ 0 & \text{otherwise,} \end{cases}$$

and wherein every point in MBR R is at a distance of at least MINDIST(R, S) from any point in MBR S; a point p in δ-dimensional space is denoted by $[p_1, p_2, \ldots, p_\delta]$; the MBR R is a δ-dimensional rectangle R denoted by the two endpoints of its major diagonal: $r=[r_1, r_2, \ldots, r_\delta]$ and $r'=[r'_1, r'_2, \ldots, r'_\delta]$ such that $r_i \leq r'_i$ for $1 \leq i \leq n$; and the MBR S is a δ-dimensional rectangle S denoted by the two endpoints of its major diagonal: $s=[s_1, s_2, \ldots, s_\delta]$ and $s'=[s'_1, s'_2, \ldots, s'_\delta]$.

15. The method according to claim 14, wherein the maximum distance between two MBRs R and S is denoted by MAXDIST(R, S) defined as MAXDIST (R, S)=$\Sigma^{\delta}_{i-1} x^2_i$, where $x_i$=max $\{|s'_i-r_i|, |r'_i-s_i|\}$.

16. A computer implemented method embedded in a recordable media for determining the top n outliers in a data set, comprising the steps of:

partitioning a plurality of data points in the data set into a plurality of partitions;

computing lower and upper bounds for each one of the plurality of partitions to identify those partitions that cannot possibly contain a predetermined number of outliers of interest;

identifying a plurality of candidate partitions from the plurality of partitions, wherein each one of the plurality of candidate partitions possibly includes at least one of n number of outliers of interest, wherein the outliers are included within the plurality of data points in the data set; and identifying the outliers from the plurality of candidate partitions wherein given the data set has N data points and the n number of outliers of interest which each have k neighbors, a data point p is one of the n outliers of interest if no more than n−1 other points in the data set have a higher value for $D^j(p)$ than data point p wherein $D^k(p)$ represents the distance of the point p to its $k^{th}$ nearest neighbor.

17. The method according to claim 16, wherein a data point having a larger value for $D^k(p)$ resides in a more sparsely populated neighborhood of points and is thus more likely to be one of the n outliers of interest n than a data point residing in a more densely populated neighborhood having a smaller value for $D^k(p)$.

18. The method according to claim 16, wherein:

the partitioning step includes calculating a minimum bounding rectangle MBR for each one of the plurality of data points in the data set; and the computing step of the lower and upper bounds being computed for each one of the data points in the MBR.

19. The method according to claim 18, wherein:

the minimum distance between a point p and an MBR R is denoted by MINDIST (p, R) defined as MINDIST (p, R)=$\Sigma^{\delta}_{i-1} x^2_i$, wherein $$x_i = \begin{cases} r_i - p_i & \text{if } p_i < r_i \\ p_i - r_i & \text{if } r'_i < p_i \\ 0 & \text{otherwise,} \end{cases}$$

and wherein every point in MBR R is at a distance of at least MINDIST (p, R) from point p; the point p in δ-dimensional space is denoted by $[p_1, p_2, \ldots, p_{\delta}]$; and the MBR R is a δ-dimensional rectangle R denoted by the two endpoints of its major diagonal: $r=[r_1, r_2, \ldots, r_{\delta}]$ and $r'=[r'_1, r'_2, \ldots, r'_7]$ such that $r_i \leq r'_i$ for $1 \leq i \leq n$; and the maximum distance between the point p and the MBR R is denoted by MAXDIST (p, R) defined as MAXDIST (p, R)=$\Sigma^{\delta}_{i-1} x^2_i$, wherein $$x_i = \begin{cases} r'_i - p_i & \text{if } p_i < r_i + r'_i/2 \\ p_i - r_i & \text{otherwise,} \end{cases}$$

and wherein no point in MBR R is at a distance that exceeds MAXDIST (p, R) from the point p.

20. The method according to claim 19, wherein:

the minimum distance between two MBRs R and S is denoted by MINDIST(R, S) defined as MINDIST (R, S)=$\Sigma^{\delta}_{i-1} x^2_i$, wherein $$x_i = \begin{cases} r_i - s'_i & \text{if } s'_i < r_i \\ p_i - r'_i & \text{if } r'_i < p_i \\ 0 & \text{otherwise,} \end{cases}$$

and wherein every point in MBR R is at a distance of at least MINDIST(R, S) from any point in MBR S; a point p in δ-dimensional space is denoted by $[p_1, p_2, \ldots, p_{\delta}]$; the MBR R is a δ-dimensional rectangle R denoted by the two endpoints of its major diagonal: $r=[r_1, r_2, \ldots, r_{\delta}]$ and $r'=[r'_1, r'_2, \ldots, r'_{\delta}]$ such that $r_i \leq r'_i$ for $1 \leq i \leq n$; and the MBR S is a δ-dimensional rectangle S denoted by the two endpoints of its major diagonal: $s=[s_1, s_2, \ldots, s_{\delta}]$ and $s'=[s'_1, s'_2, \ldots, s'_{\delta}]$; and the maximum distance between two MBRs R and S is denoted by MAXDIST(R, S) defined as MAXDIST (R, S)=$\Sigma^{\delta}_{i-1} x^2_i$, where $x_i$=max $\{|s'_i-r_i|, |r'_1-s_1|\}$.

* * * * *